United States Patent [19]

Lehr

[11] Patent Number: 5,006,644
[45] Date of Patent: Apr. 9, 1991

[54] COPPER COMPLEXES OF FURTHER SUBSTITUTED 2,4-DI-[2'-(2''-HYDROXYPHENYLAZO)-1'-HYDROXY-3'-SULFONAPHTHYL-6'-AMINO]-6-CHLORO-1,3,5-TRIAZINES

[75] Inventor: Friedrich Lehr, Efringen/Kirchen, Fed. Rep. of Germany

[73] Assignee: Sandoz Ltd., Basel, Switzerland

[21] Appl. No.: 1,070

[22] Filed: Jan. 7, 1987

Related U.S. Application Data

[63] Continuation of Ser. No. 683,602, Dec. 19, 1984, abandoned, which is a continuation-in-part of Ser. No. 503,268, Jun. 10, 1983, abandoned.

[30] Foreign Application Priority Data

Jun. 19, 1982 [DE] Fed. Rep. of Germany ....... 3223022

[51] Int. Cl.$^5$ .................... C09B 62/09; C09B 62/095; C09B 67/22; C09B 67/24
[52] U.S. Cl. ..................................... 534/625; 534/573; 534/701; 8/549; 8/641
[58] Field of Search ....................... 534/625, 573, 701; 8/549, 641

[56] References Cited

U.S. PATENT DOCUMENTS

| | | | |
|---|---|---|---|
| 1,779,298 | 10/1930 | Straub et al. | 534/701 |
| 2,467,621 | 4/1949 | Kaiser et al. | 534/625 X |
| 2,835,663 | 5/1958 | Benz, I | 534/701 |
| 3,803,121 | 4/1974 | Gregory | 534/625 X |
| 4,010,150 | 3/1977 | Tabet et al. | 534/625 X |

FOREIGN PATENT DOCUMENTS

| | | | |
|---|---|---|---|
| 0011873 | 6/1980 | European Pat. Off. | 534/625 |
| 436179 | 10/1926 | Fed. Rep. of Germany | 534/701 |
| 1002898 | 2/1957 | Fed. Rep. of Germany | 534/701 |
| 2360725 | 6/1974 | Fed. Rep. of Germany | 534/625 |
| 1519130 | 3/1968 | France | 534/625 |
| 39-23971 | 10/1964 | Japan | 534/627 X |
| 58-96656 | 6/1983 | Japan | 534/625 |
| 523572 | 5/1984 | Spain | 534/701 |
| 1454210 | 11/1976 | United Kingdom | 534/625 |
| 2007250 | 5/1979 | United Kingdom | 534/701 |
| 2007698 | 5/1979 | United Kingdom | 534/625 |
| 2114992 | 9/1983 | United Kingdom | 534/701 |
| 2122634 | 1/1984 | United Kingdom | 534/625 |

OTHER PUBLICATIONS

Venkataraman, "The Chemistry of Synthetic Dyes", vol. I, pp. 523, 547 (1952).

Colour Index, 3rd Ed., vol. 4, pp. 2132, 4274, 5102 (1971).

Primary Examiner—Floyd D. Higel
Attorney, Agent, or Firm—Gerald D. Sharkin; Richard E. Vila; Melvyn M. Kassenoff

[57] ABSTRACT

Complexes of the formula

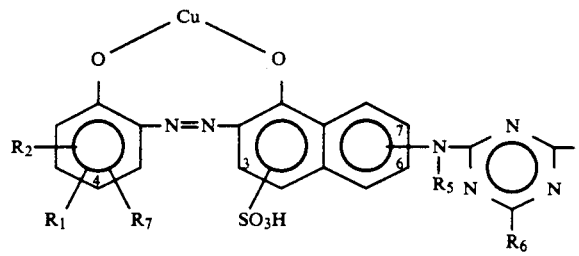

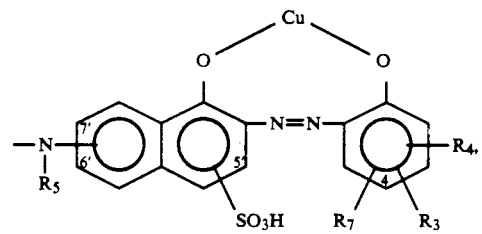

and salts thereof, wherein each of $R_1$–$R_4$ is independently hydrogen, halo, nitro, $C_{1-4}$alkyl, $C_{1-4}$alkoxy, —NHCOR$_8$, —COX or —SO$_2$Z, wherein R$_8$ is $C_{1-4}$alkyl or phenyl, X is hydroxy, $C_{1-4}$alkoxy, phenoxy, substituted phenoxy, phenyl($C_{1-4}$alkoxy), substituted phenyl($C_{1-4}$alkoxy), $C_{1-4}$alkyl, phenyl, substituted phenyl, cyclohexyl, cyclohexyl substituted by 1 to 3 $C_{1-4}$alkyl groups, amino or substituted amino, and Z is —CH$_2$CH$_2$OSO$_3$H, —CH=CH$_2$ or a significance of X with the exception of $C_{1-4}$alkyl, with the proviso that 1 to 3 of $R_1$–$R_4$ are —SO$_2$Z or at least two of $R_1$–$R_4$ are —COOH, each R$_5$ is independently hydrogen, $C_{1-4}$alkyl or $C_{1-4}$alkyl monosubstituted by hydroxy, chloro or cyano, R$_6$ is halo, hydroxy, $C_{1-4}$alkoxy, phenoxy, amino or substituted amino, and each R$_7$ is independently hydrogen or halo, and mixtures of such complexes each of which is independently in free acid or salt form, are useful for dyeing and printing hydroxy group or nitrogen-containing organic substrates, especially paper, leather and cellulosic textile materials; the fastness properties of the obtained dyeings and prints on textile material comprising cellulose fibers may be further improved by aftertreating the dyed or printed substrate with a special fixing agent.

18 Claims, No Drawings

COPPER COMPLEXES OF FURTHER SUBSTITUTED 2,4-DI-[2'-(2''-HYDROXYPHENYLAZO)-1'-HYDROXY-3'-SULFONAPHTHYL-6'-AMINO]-6-CHLORO-1,3,5-TRIAZINES

This application is a continuation of application Ser. No. 06/683,602, filed Dec. 19, 1984 and now abandoned, which is a continuation-in-part of application Ser. No. 06/503,268, filed June 10, 1983 and now abandoned.

This invention relates to metallized disazo compounds, processes for their preparation and their use for dyeing or printing hydroxy group- or nitrogen-containing organic substrates employing conventional dyeing or printing methods; furthermore, this invention relates to a process for dyeing or printing textile material comprising cellulose fibres with the metallized disazo compounds and after-treating the dyed or printed substrate with a suitable fixing agent.

The invention provides compounds which, in free acid form, correspond to formula I

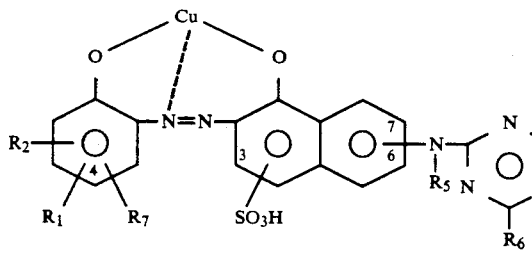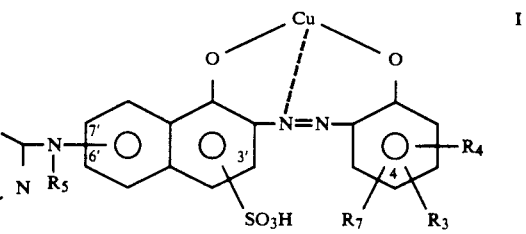

in which each of $R_1$ and $R_2$, independently, is hydrogen, halogen, nitro, $C_{1-4}$alkyl, $C_{1-4}$alkoxy, —NHCOR$_8$, —COX or —SO$_2$Z, R$_8$ is $C_{1-4}$alkyl or phenyl, each X, independently, is OH;—OR$_9$; $C_{1-4}$alkyl; phenyl; phenyl substituted by 1 or 2 substituents selected from halogen, nitro, $C_{1-4}$alkyl and $C_{1-4}$alkoxy; cyclohexyl; cyclohexyl substituted by 1 to 3 $C_{1-4}$alkyl groups; or is —NR$_{10}$R$_{11}$, each Z, independently, is —CH$_2$CH$_2$OSO$_3$H or —CH=CH$_2$ or has one of the significances of X with the exception of $C_{1-4}$alkyl, R$_9$ is $C_{1-4}$alkyl; phenyl or phenyl ($C_{1-4}$alkyl), wherein the phenyl ring may be substituted by 1 or 2 substituents selected from halogen, nitro, $C_{1-4}$alkyl and $C_{1-4}$alkoxy, R$_{10}$ is hydrogen, $C_{1-4}$alkyl, $C_{2-4}$alkyl substituted by 1 or 2 substituents selected from-OH, $C_{1-4}$alkoxy, halogen and cyano; phenyl; phenyl substituted by 1 or 2 substituents selected from halogen, nitro, $C_{1-4}$alkyl and $C_{1-4}$alkoxy; cyclohexyl; or cyclohexyl substituted by 1 to 3 $C_{1-4}$alkyl groups, R$_{11}$ is hydrogen, $C_{1-4}$alkyl; $C_{2-4}$alkyl substituted by 1 or 2 substituents selected from-OH, $C_{1-4}$alkoxy, halogen and cyano; cyclohexyl; or cyclohexyl substituted by 1 to 3 $C_{1-4}$alkyl groups; or R$_{10}$ and R$_{11}$, together with the nitrogen atom to which they are bound, form a saturated 5- or 6-membered hetero ring which optionally contains a further hetero atom, each of R$_3$ and R$_4$, independently, has one of the significances of R$_1$ and R$_2$ provided that either at least one and at most three of R$_1$ to R$_4$ are a group —SO$_2$Z, or, if no group —SO$_2$Z is present, at least two of R$_1$ to R$_4$ are a group —COX wherein X is —OH, each R$_5$, independently, is hydrogen, $C_{1-4}$alkyl; or $C_{1-4}$alkyl monosubstituted by —OH, chlorine or cyano, each R$_7$, independently, is hydrogen or halogen, and R$_6$ is halogen, —OH, $C_{1-4}$alkoxy, phenoxy, —NH$_2$, —NHOH, an aliphatic, aromatic or cycloaliphatic amine radical or a saturated heterocyclic amine radical in which the nitrogen atom is part of the heterocycle which optionally contains further hetero atoms, and mixtures of compounds of formula I, which compounds are in free acid or salt form, with the proviso that a) when (1) both terminal phenyl groups contain a sulpho group in the 4-position and all other radicals of these phenyl groups are hydrogen, (2) each R$_5$ is hydrogen, (3) each naphthyl ring is bound to the amino group in the 6- and 6'-positions, respectively, (4) each sulpho group on the naphthyl rings is in the 3- and 3'-positions, respectively, and all the conditions (1) to (4) occur simultaneously, R$_6$ is other than —NHC$_6$H$_5$, —NHCH$_2$CH$_2$OH or —NH$_2$;

b) when (1) each R$_5$ is hydrogen, (2) each naphthyl ring is bound to the amino group in the 6- and 6'-positions, respectively, (3) each sulpho group on the naphthyl rings is in the 3- and 3'-positions, respectively, (4) one of the two terminal phenyl groups contains a group —SO$_2$Z, wherein Z is —NR$_{10}$R$_{11}$, in the 4-position, and all the conditions (1) to (4) occur simultaneously, either α) the other terminal phenyl group is substituted by sulpho and R$_6$ is other than —NHC$_6$H$_5$ or —NH$_2$, or β) the other terminal phenyl group is substituted by a group —SO$_2$Z, wherein Z is —NR$_{10}$R$_{11}$, and R$_6$ is other than —NHC$_6$H$_5$;

c) when (1) both terminal phenyl groups contain a sulpho group in the 4-position and all other radicals of these phenyl groups are hydrogen, (2) each R$_5$ is hydrogen, (3) each naphthyl ring is bound to the amino group in the 7- and 7'-positions, respectively, (4) each sulpho group on the naphthyl rings is in the 3- and 3'-positions, respectively, and all the conditions (1) to (4) occur simultaneously, R$_6$ is other than 3-amino-4-chlorophenylamino.

Any halogen as an alkyl substituent is fluorine, chlorine or bromine, preferably chlorine or bromine. Any halogen as a phenyl substituent is chlorine or bromine, especially chlorine.

Any halogen as R$_6$ is fluorine, chlorine or bromine, especially chlorine.

In any hydroxy- or alkoxy-substituted alkyl group as defined for R$_5$, R$_{10}$ and R$_{11}$ which are linked to nitrogen atoms or for R$_6$ as an amino group containing such a group, the hydroxy or alkoxy group is bound to a carbon atom other than to the $C_1$-atom; furthermore, in any alkyl group substituted by two hydroxy groups as defined for $R_{10}$ and $R_{11}$ or for $R_6$ as an amino group containing such a group, the hydroxy groups are bound to different carbon atoms.

Any alkyl as $R_1$ to $R_4$, independently, is preferably methyl or ethyl, more preferably methyl; any alkoxy, independently, is preferably methoxy or ethoxy, more preferably methoxy.

Any alkyl as $R_8$ is preferably methyl or ethyl, more preferably methyl.

$R_8$ is preferably $R_{8a}$, where $R_{8a}$ is methyl, ethyl or phenyl. More preferably, it is $R_{8b}$, where $R_{8b}$ is methyl or phenyl. Most preferably, $R_8$ is methyl.

Any alkyl as $R_9$ is preferably methyl or ethyl. Any phenylalkyl group as $R_9$ preferably contains a $C_{1-2}$alkyl group. In any substituted phenyl- or phenylalkyl-group the phenyl ring is preferably monosubstituted by chlorine, nitro, methyl or methoxy.

$R_9$ is preferably $R_{9a}$, where $R_{9a}$ is methyl, ethyl, phenyl or phenyl ($C_{1-2}$alkyl), wherein the phenyl ring may be monosubstituted by chlorine, nitro, methyl or methoxy. More preferably, it is $R_{9b}$, where $R_{9b}$ is methyl, ethyl, phenyl or benzyl. Most preferably, it is $R_{9c}$, where $R_{9c}$ is methyl or ethyl.

Any alkyl as X, independently, is preferably methyl or ethyl. Any substituted phenyl as X and Z, independently, is preferably monosubstituted by chlorine, methyl or methoxy.

Any alkyl as $R_{10}$ and $R_{11}$, independently, is preferably methyl or ethyl. Any substituted alkyl, independently, is preferably $C_{2-3}$alkyl, which is preferably monosubstituted by hydroxy, methoxy, chlorine or cyano; more preferably, it is monosubstituted by hydroxy.

Any substituted phenyl as $R_{10}$ is preferably substituted by 1 or 2 substituents selected from chlorine, nitro, methyl and methoxy; more preferably, it is monosubstituted by chlorine or methyl.

Any alkyl substituted cyclohexyl as $R_{10}$ and $R_{11}$, independently, is preferably substituted by up to 3 methyl groups.

$R_{10}$ and $R_{11}$, together with the nitrogen atom to which they are bound, preferably form a morpholine-, piperidine-, piperazine- or pyrrolidine-ring, which preferably is unsubstituted; more preferably, they form an unsubstituted morpholine- or piperazine-ring, especially a piperazine ring.

$R_{10}$ is preferably $R_{10a}$, where $R_{10a}$ is hydrogen, methyl, ethyl; $C_{2-3}$alkyl monosubstituted by hydroxy, methoxy, chlorine or cyano; phenyl; phenyl substituted by 1 or 2 substituents selected from chlorine, nitro, methyl and methoxy; cyclohexyl or cyclohexyl substituted by 1 to 3 methyl groups or, together with $R_{11}$ and the nitrogen atom to which $R_{10a}$ and $R_{11}$ are bound, forms a piperidine-, piperazine- or morpholine-ring. More preferably, it is $R_{10b}$, where $R_{10b}$ is hydrogen, methyl, ethyl, monohydroxysubstituted $C_{2-3}$alkyl; phenyl; phenyl monosubstituted by chlorine or methyl: cyclohexyl or, together with $R_{11}$ and the nitrogen atom to which $R_{10b}$ and $R_{11}$ are bound, forms a piperazine ring. Even more preferably, it is $R_{10c}$, where $R_{10c}$ is hydrogen, methyl, ethyl, monohydroxy substituted $C_{2-3}$alkyl or cyclohexyl. Most preferably $R_{10}$ is hydrogen.

$R_{11}$ is preferably $R_{11a}$, where $R_{11a}$ is hydrogen, methyl; ethyl; $C_{2-3}$alkyl monosubstituted by hydroxy, methoxy, chlorine or cyano; cyclohexyl or, together with $R_{10}$ and the nitrogen atom to which $R_{10}$ and $R_{11a}$ are bound, forms a piperidine-, piperazine- or morpholine-ring. More preferably, it is $R_{11b}$, where $R_{11b}$ is hydrogen, methyl, ethyl, monohydroxy substituted $C_{2-3}$alkyl, cyclohexyl or, together with $R_{10}$ and the nitrogen atom to which $R_{10}$ and $R_{11b}$ are bound, forms a piperazine ring. Most preferably, $R_{11}$ is hydrogen.

X is preferably Xa, where Xa is —OH; —$OR_{9a}$; methyl, ethyl, phenyl; phenyl monosubstituted by chlorine, methyl or methoxy; or —$NR_{10b}R_{11b}$. More preferably, it is Xb, where Xb is —OH, —$OR_{9b}$, methyl, ethyl, phenyl or —$NHR_{10c}$. More preferably, it is Xc, where Xc is —OH, —$OR_{9c}$ or —$NH_2$. Most preferably, X is OH.

Z is preferably Za, where Za is —OH; —$OR_{9c}$; phenyl; phenyl monosubstituted by chlorine, methyl or methoxy; —$NR_{10a}R_{11a}$; —$CH_2CH_2OSO_3H$ or —$CH=CH_2$. More preferably, it is Zb, where Zb is —OH, phenyl, —$NR_{10b}R_{11b}$, —$CH_2CH_2OSO_3H$ or —$CH=CH_2$. More preferably, it is Zc, where Zc is —OH, phenyl or —$NHR_{10c}$. More preferably, it is Zd, where Zd is —OH or —$NH_2$. Most preferably, Z is —OH.

Each of $R_1$, $R_2$, $R_3$ and $R_4$ is preferably $R_{1a}$, $R_{2a}$, $R_{3a}$ and $R_{4a}$, where each of $R_{1a}$–$R_{4a}$, independently, is hydrogen, chlorine, nitro, methyl, ethyl, methoxy, ethoxy, —$NHCOR_{8a}$, —COXa or —$SO_2Za$, with the proviso that 1 to 3 of $R_{1a}$–$R_{4a}$ are —$SO_2Za$ or at least two of $R_{1a}$–$R_{4a}$ are —COOH. More preferably, each of them, independently, is $R_{1b}$, $R_{2b}$, $R_{3b}$ and $R_{4b}$, where each of $R_{1b}$–$R_{4b}$ is hydrogen, chlorine, nitro, methyl, methoxy, —$NHCOR_{8b}$, —COXb or —$SO_2Zb$, with the proviso that 1 or 2 of $R_{1b}$–$R_{4b}$ are —$SO_2Zb$ or at least two of $R_{1b}$–$R_{4b}$ are —COOH. More preferably, each of $R_1$ and $R_3$, independently, is $R_{1c}$ and $R_{3c}$, where each of $R_{1c}$ and $R_{3c}$ is —$SO_2Zc$; and each of $R_2$ and $R_4$, independently, is $R_{2c}$ and $R_{4c}$, where each of $R_{2c}$ and $R_{4c}$ is hydrogen, chlorine, nitro, methyl, —$NHCOCH_3$ or —COXc. More preferably, each of $R_1$ and $R_3$, independently, is $R_{1d}$ and $R_{3d}$, where each of $R_{1d}$ and $R_{3d}$ is —$SO_2Zd$; and each of $R_2$ and $R_4$, independently, is $R_{2d}$ and $R_{4d}$, where each $R_{2d}$ and $R_{4d}$ is hydrogen, chlorine or methyl. Most preferably, each of $R_1$ and $R_3$ is —$SO_3H$; and each of $R_2$ and $R_4$, independently, is hydrogen or chlorine.

Preferably, each $R_7$, independently, is $R_{7a}$, where $R_{7a}$ is hydrogen or chlorine; most preferably, $R_7$ is hydrogen.

Any alkyl as $R_5$ is preferably methyl or ethyl; any substituted alkyl is preferably monohydroxy substituted $C_{2-3}$alkyl.

Each $R_5$ is preferably $R_{5a}$, where each $R_{5a}$, independently, is hydrogen, methyl, ethyl or monohydroxy substituted $C_{2-3}$alkyl. Most preferably, $R_5$ is hydrogen.

Any alkoxy as $R_6$ is preferably methoxy.

When $R_6$ is an aliphatic amino group it is preferably a monoalkyl- or dialkyl-amino group in which the alkyl group contains 1 to 4 carbon atoms and is straight chain or branched and is optionally substituted by halogen, —$NH_2$, carboxy, sulpho or one or two hydroxy groups.

Any cycloaliphatic amine radical as $R_6$ is preferably a $C_{5-6}$cycloalkylamino group, especially a cyclohexylamino group.

Any aromatic amine radical is preferably phenylamino in which the phenyl ring is optionally substituted by 1 or 2 substituents selected from halogen, $C_{1-4}$alkyl, $C_{1-4}$alkoxy, —$NHCOC_{1-4}$alkyl, sulpho, carboxy and —$SO_2CH_2CH_2OSO_3H$; more preferably, it is monosubstituted by —$NHCOC_{1-4}$alkyl, sulpho or —$SO_2CH_2CH_2OSO_3H$.

Any heterocyclic amine radical as $R_6$ is preferably morpholine, piperidine, piperazine or pyrrolidine which are further unsubstituted.

$R_6$ is preferably either $R_{6a}$, where $R_{6a}$ is chlorine, —OH, —NH$_2$, methoxy, mono-C$_{1-4}$alkylamino, monohydroxy-C$_{3-4}$alkylamino, monoamino-C$_{2-4}$alkylamino; dihydroxy-C$_{2-4}$alkylamino, bis(monohydroxy-C$_{2-4}$alkyl)amino; phenylamino in which the phenyl ring is optionally substituted by 1 or 2 substituents selected from chlorine, methyl, methoxy, acetamido, sulpho, carboxy and —SO$_2$CH$_2$CH$_2$OSO$_3$H; or morpholino; or $R_{6ax}$, where $R_{6ax}$ is —OH, methoxy, mono-C$_{1-4}$alkylamino, dihydroxy-C$_{3-4}$alkylamino, bis(monohydroxy-C$_{2-4}$alkyl)amino, monoamino-C$_{2-4}$alkylamino; phenylamino in which the phenyl ring is substituted by 1 or 2 substituents selected from chlorine, methyl, methoxy, acetamido, sulpho, carboxy and —SO$_2$CH$_2$C-H$_2$OSO$_3$H; or morpholino. More preferably, $R_6$ is either $R_{6b}$ where $R_{6b}$ is chlorine, mono-Chd 1-2alkylamiono, monohydroxy-C$_{2-3}$alkylamino, dihydroxy-C$_{3-4}$alkylamino, bis(monohydroxy-C$_{2-3}$alkyl)amino; phenylamino in which the phenyl ring is monosubstituted by acetamido or sulpho; or morpholino; or $R_{6bx}$, where $R_{6bx}$ is mono-C$_{1-2}$alkylamino, dihydroxy-C$_{3-4}$alkylamino, bis(monohydroxy-C$_{2-3}$alkyl)amino, phenylamino in which the phenyl ring is monosubstituted by acetamido or sulpho; or morpholino. More preferably, $R_6$ is either $R_{6c}$, where $R_{6c}$ is chlorine, 2-hydroxyethylamino, bis(2-hydroxyethyl)amino or sulphophenylamino; or is $R_{6cx}$, where $R_{6cx}$ is bis(2-hydroxyethyl)amino or sulphophenylamino. Most preferably, $R_6$ is chlorine. In the compounds of formula I the naphthyl radicals are bound to the —NR$_5$-groups preferably in the 6,6'- or 7,7'-positions, more preferably in the 6,6'-positions. The sulpho group of the naphthyl radicals is preferably bound to the 3- and 3'-positions, respectively.

Preferred compounds correspond, in the free acid form, to formula Ia,

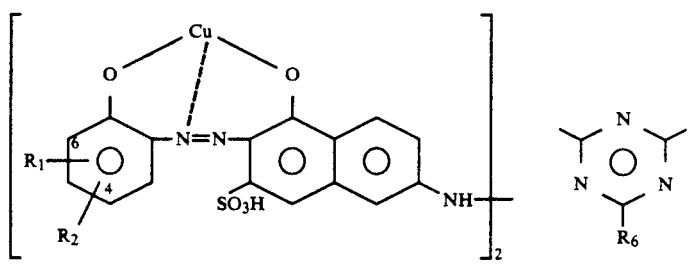

Ia in which either each $R_1$ is sulpho in the 4-position, each $R_2$ is hydrogen and $R_6$ is $R_{6ax}$, more preferably $R_{6bx}$, most preferably $R_{6cx}$; or $R_1$ and $R_2$ are in the 4,6-positions and each of $R_1$ and $R_2$ is $R_{1a}$ and $R_{2a}$ (where $R_{1a}$ and $R_{2a}$ are independently of each other), with the exception that when one of $R_{1a}$ and $R_{2a}$ is sulpho in the 4-position, the other is different from hydrogen, and $R_6$ is $R_{6a}$, provided that one of $R_{1a}$ and $R_{2a}$ is —COOH or —SO$_2$a, and the other is different from —SO$_2$Z$_1$; more preferably, each of $R_1$ and $R_2$ is $R_{1b}$ and $R_{2b}$ in the 4,6-positions (where $R_{1b}$ and $R_{2b}$ are independently of each other), with the exception that when one of $R_{1b}$ and $R_{2b}$ is sulpho in the 4-position, the other is different from hydrogen, and $R_6$ is $R_{6b}$, provided that one of the radicals $R_{1b}$ and $R_{2b}$ is —COOH or —SO$_2$Zb, and the other is different from —SO$_2$Zb; more preferably, each $R_1$ is $R_{1c}$ and each $R_2$ is $R_{2c}$ and $R_{1c}$ and $R_{2c}$ are in the 4,6-positions, provided that when $R_{1c}$ is sulpho in the 4-position, $R_{2c}$ is other than hydrogen, and $R_6$ is $R_{6c}$; most preferably, each $R_1$ is $R_{1d}$, especially sulpho, and each $R_2$ is $R_{2d}$, especially hydrogen or chlorine, and $R_{1d}$ and $R_{2d}$ are in the 4,6-positions, provided that when $R_{1d}$ is sulpho in the 4-position, $R_{2d}$ is other than hydrogen, and $R_6$ is $R_{6c}$, especially chlorine.

Also preferred are compounds which, in free acid form, correspond to formula Ib,

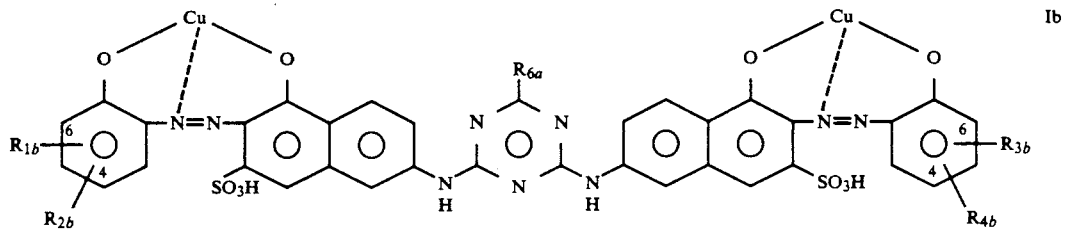

in which on each phenyl ring $R_{1b}$ and $R_{2b}$, and $R_{3b}$ and R4b, respectively, are in the 4,6-positions provided that either at least one and at most three, preferably at most two of $R_{1b}$ to $R_{4b}$ are a group —SO$_2$Zb or, if no group —SO$_2$Zb is present, at least two of $R_{1b}$ to $R_{4b}$, are —COOH. Further preferred are compounds of formula Ib, wherein (1) $R_{6a}$ is $R_{6b}$;

(2) each of $R_{1b}$ and $R_{3b}$, independently, is $R_{1c}$ and $R_{3c}$ and each of $R_{2b}$ and $R_{4b}$, independently, is $R_{2c}$ and $R_{4c}$, and the radicals $R_{1c}$ and $R_{2c}$ and the radicals $R_{3c}$ and $R_{4c}$ are in the 4,6-positions;

(3) those of (2) wherein $R_{6a}$ is $R_{6b}$;

(4) each of $R_{1b}$ and $R_{3b}$, independently, is $R_{1d}$ and $R_{3d}$ and each of $R_{2b}$ and $R_{4b}$, independently, is $R_{2d}$ and $R_{4d}$ and the radicals $R_{1d}$ and $R_{2d}$ and the radicals $R_{3d}$ and $R_{4d}$ are in the 4,6-positions;

(5) those of (4) wherein each of $R_{1d}$ and $R_{3d}$ is sulpho and each of $R_{2d}$ and $R_{4d}$, independently, is hydrogen or chlorine;

(6) those of (4) or (5), wherein $R_{6a}$ is $R_{6c}$;

(7) those of (6), wherein $R_{6a}$ is chlorine.

When the compounds of formula I, Ia or Ib are in the salt form, the cation of the sulpho and/or carboxy groups is not critical and may be any of those non-chromophoric cations conventional in the field of anionic direct dyestuffs. Generally, in a compound of formula I, Ia or Ib the cations of the sulpho and/or carboxy groups may be the same or different, e.g. the compound may be in a mixed salt form;, preferably, the cations are the same. Examples of such cations are alkali metal cations and unsubstituted or substituted ammonium cations e.g. lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

The present invention further provides a process for the preparation of compounds of formula I comprising reacting the following components:

diazotized amino compounds of formulae IIa and IIb,

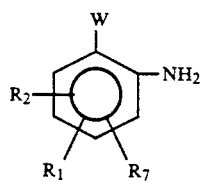

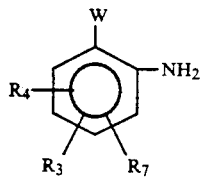

wherein $R_1$ to $R_4$ and $R_7$ are as defined above and each W, independently, is hydrogen, hydroxy or methoxy, coupling components of formula III,

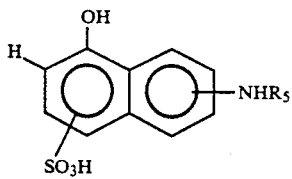

wherein $R_5$ is as defined above;

a triazine compound of formula IV,

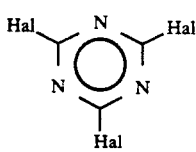

wherein Hal is halogen;

optionally a base or a compound of formula V,

H—Y      V wherein Y has one of the significances of $R_6$ as defined above with the exception of halogen and hydroxy;

a copper-donating compound to obtain a 1:1 copper complex;

which components must be present in the corresponding stoichiometric molar ratio to obtain a compound of formula I -by coupling and condensing in any desired order and coppering the resulting monoazo compounds before or after the condensation reactions.

It is preferred to carry out coppering as a final step comprising reacting a compound of formula VI,

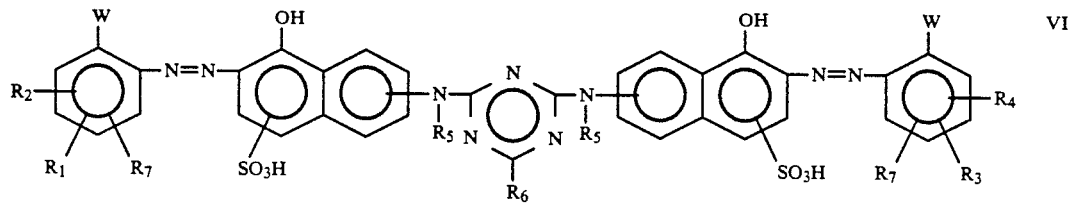

in which $R_1$ to $R_7$ and W are as defined above, with a copper donating compound which is employed in such an amount to provide at least one equivalent of copper per equivalent of monoazo compound to be metallized.

In the case where different compounds of formulae IIa and IIb and/or different compounds of formula III are employed and the coupling reactions are carried out other than by two separate processes, namely, by a one step mixed coupling, a mixture of compounds of formula I is obtained consisting of those compounds having two different chromophores and those having identical chromophores.

The 1:1 metallization is carried out in accordance with known methods. Suitably, the corresponding hydroxy group-containing compounds (W=—OH) are used as starting materials, and coppering is preferably effected at a temperature range of 20°–50° C. in a weakly acid reaction medium using the conventional copper(II) salts. Likewise, oxidative coppering (W=H), preferably at 40°–70° C. and at pH 4–7 in the presence of copper(II) salts or using copper powder in the presence of hydrogen peroxide or other conventional oxidizing agents; or demethylation coppering (W=—OCH$_3$), preferably at pH 4–6 and at elevated to boiling temperature in the presence of copper(II) salts, are carried out.

Diazotization and coupling reactions may be effected in conventional manner. The replacement of the halogen atoms in a compound of formula IV by separate condensation steps may be effected in conventional manner.

The compounds of formula I may be isolated in accordance with known methods, for example by conventional salting out with a small amount of an alkali metal salt, filtering and drying in vacuo.

The starting materials of formulae IIa, IIb, III and V are either known or may be prepared in accordance with known methods from available starting materials.

The compounds of formula I and mixtures thereof which are preferably in salt form are useful for dyeing or printing hydroxy group- or nitrogen-containing organic substrates. Preferred substrates are paper, leather and textiles containing or consisting of cellulose fibres, such as cotton.

The compounds according to the invention show high affinity for the substrate and therefore are good direct dyes. Dyeing and printing may be carried out in accordance with known methods. Dyeing of natural or regenerated cellulose such as cotton is preferably carried out according to the conventional exhaust dyeing method using temperatures from 50° to 100° C. Continuous dyeing methods are also suitable and thus processes such as cold pad-batch, pad-steam, pad-roll or pad-dry may be applied.

The compounds of formula I give deep dyeings and show high exhaustion yields. The dyestuffs are also suitable for dyeing in combination with analogous dyes showing similar dyeing properties. Dyeings and prints on the above mentioned substrates exhibit good wet fastnesses (such as fastness to water, washing or sweat) and good light fastness. Furthermore, they show good fastness to peroxide, perborate and chlorinated water. The fastness to dry cleaning is also good.

The wet fastness properties of the dyeings and printings on textile material containing or consisting of cellulose fibres, especially on cotton, made with the compounds of formula I or a mixture thereof may be notably improved by a special resin after-treatment with cationic auxiliaries. Particularly, this treatment gives improved wash-fastness properties allowing repeated washing at high temperatures.

Suitable for applying to the dyed or printed substrate is a fixing agent comprising a precondensate of either
A) the product of reacting a mono- or polyfunctional primary or secondary amine with cyanamide, dicyandiamide, guanidine or biguanide, said product A) containing reactive hydrogen atoms bound to nitrogen, or
B) a quaternary polyalkylene polyamine, with
C) an N-methylol derivative of a urea, melamine, guanamine, triazinone, urone, carbamate or acid amide, together with
D) a catalyst for the crosslinking of N-methylol compounds of the type C) above.

Details concerning the fixing agent as a combination of A), C) and D) and its use are described in British Published Patent Application No. 2 070 006, of which the whole subject matter disclosed on pages 1 to 6 is hereby incorporated by reference. Details concerning the combination B), C) and D) are described in British Published Patent Application No. 2 084 597, of which the entire subject matter disclosed on pages 1 to 5 and 7 is hereby incorporated by reference.

The following examples further serve to illustrate the subjects of the invention. In the examples all parts and percentages are by weight or volume and all temperatures are in degrees Centigrade.

PREPARATION EXAMPLES

Example 1

23.1 Parts 6-chloro-2-amino-1-hydroxybenzene-4-sulphonic acid in 60 parts water are diazotized in conventional manner at 0°-10° within 30 minutes. The pH is adjusted to 5 by adding 20% sodium carbonate solution. Subsequently, a solution of 31.7 parts 2-chloro-4,6-di-(5'-hydroxy-7'-sulphonaphthyl-2'-amino)-1,3,5-triazine in form of the disodium salt (prepared as described in Example 4) in 400 parts water is added quickly which solution has been cooled to 5°-10° and to which 17.5 parts sodium bicarbonate has been added. Stirring is effected for 2 hours at 0°-5°. The temperature of the reaction mixture is then raised to room temperature within 10 to 20 hours.

The resultant dye solution is heated to 40°-50°. The pH is adjusted to 6.5 by the addition of 20% hydrochloric acid. 20 Parts sodium acetate (crystalline) are added and within 30 minutes a solution of 25 parts copper sulphate pentahydrate in 90 parts water is added dropwise. The reaction mixture is stirred for one hour. It is heated to 60 at pH 6 and is salted out by adding 15 parts sodium chloride per 100 parts reaction mixture. The resulting dyestuff which is filtered off at 60° and dried in vacuo at 70-80° corresponds, in free acid form, to the formula

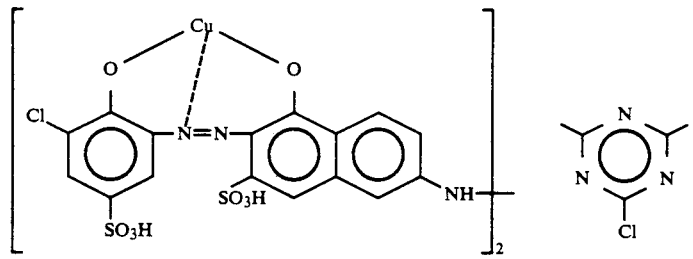

and gives dyeings on cotton of a rubine red shade.

Example 2

18.8 Parts 2-amino-1-hydroxybenzene-4-sulphonic acid amide in ca. 150 parts water are diazotized in conventional manner at 0°-5° using a 4N sodium nitrite solution in the presence of 30% hydrochloric acid. The resultant mixture is added dropwise to a solution of 63.4 parts 2-chloro-4,6-di-(5'-hydroxy-7'-sulphonaphthyl-2'-amino)-1,3,5-triazine in form of the disodium salt (prepared as described in Example 4) in 700 parts water to which 35 parts sodium bicarbonate has been added and which has been cooled to ca. 10° . The mixture is stirred for one hour at 9-11 , and stirring is continued over night at room temperature.

26.5 Parts sodium carbonate in 175 parts water are added. The reaction mixture is cooled to 10°-15° by the addition of ice. Within 20 minutes a solution obtained by conventional diazotization of 20.8 parts 2-amino-1-hydroxybenzene-4-sulphonic acid in 70 parts water is added dropwise. Stirring is effected for 3-4 hours at 10°-15° and is continued overnight at room temperature.

The pH is adjusted to 6.4 by adding ca. 74 parts 30% hydrochloric acid, and 40 parts sodium acetate are added. An aqueous solution containing 50 parts copper sulphate pentahydrate is added dropwise within 30 minutes. After 10 minutes the pH is adjusted to 6.5 by adding ca. 25 parts 30% sodium hydroxide solution. The mixture is heated to 80° and is salted out by the addition of sodium chloride (12 parts NaCl per 100 parts reaction mixture). The thus obtained dyestuff which is filtered off at 60° and dried in vacuo at 70°-80° corresponds, in the free acid form, to the formula

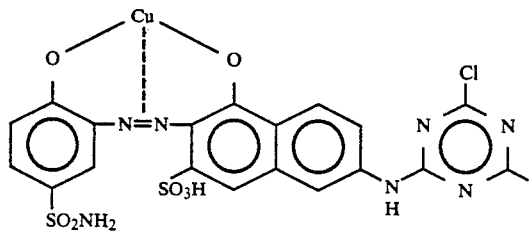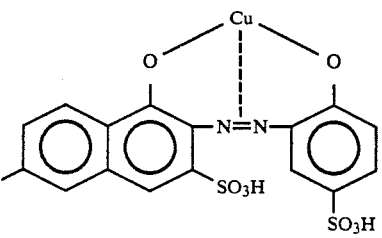

and dyes cotton in rubine red shades.

Example 3

3a) 96.5 Parts 2-amino-1-hydroxybenzene-4-sulphonic acid are suspended at ca. 0° in 200 parts water, 100 parts ice and 17 parts 30% hydrochloric acid. A solution of 35 parts sodium nitrite in 100 parts water is added dropwise during ca. 40 minutes without any external cooling. The temperature is held at 8°-12° by adding 200 parts ice whilst stirring for 30 minutes. Subsequently, the excess nitrous acid is decomposed by adding a small quantity of amidosulphonic acid. The pH is adjusted to 5 by the addition of 10 parts sodium carbonate (calcinated) in 50 parts water.

To a suspension consisting of 70 parts calcium chloride in 225 parts water and 200 parts 30% sodium hydroxide solution which has been cooled to 20° by ca. 50 parts ice, 120 parts 2-amino-5-hydroxynaphthalene-7-sulphonic acid are added. Cooling is effected to 10° by adding ca. 120 parts ice. The above prepared diazo solution is then added within 15 minutes whilst maintaining the temperature at 10°-15° by adding ca. 150 parts ice. Stirring is effected for 2 hours at the same temperature.

The coupling mixture is heated to 50°-55°. 90 parts sodium carbonate (calcinated) are added and stirring is continued for 30 minutes at this temperature. 10 Parts HYFLO filtering earth are added and the mixture is filtered. The filter residue is washed with 200 parts water.

The resulting filtered solution is adjusted to pH 6.4 by the addition of 30% hydrochloric acid. After the addition of 100 parts sodium acetate, a solution of 115 parts copper sulphate pentahydrate in 200 parts water is added dropwise within 45 minutes. The mixture is stirred for 15 minutes and is adjusted to pH 6.5 by 30% sodium hydroxide solution, heated to 60° and salted out by adding sodium chloride. The resultant copper complex is filtered at 60° and dried in vacuo at an elevated temperature.

3b) 113.5 Parts 6-chloro-2-amino-1-hydroxybenzene-4-sulphonic acid are coupled with 2-amino-5-hydroxynaphthalene-7-sulphonic acid and coppered according to the method described under 3a). The copper complex is isolated by salting out according to the method given under 3a).

To a suspension of 3.7 parts cyanuric chloride in 100 parts ice water 10 parts of the copper complex (100 %) prepared under 3a) which are dissolved in 300 parts water are added at 0°-5° and at pH 4.5-6 within 30 minutes. Stirring is effected for one hour at 0°-5° and at pH 5-6, the temperature is then raised to room temperature and the pH is elevated to 7.

10.7 parts of the copper complex (100%) prepared under 3b) in 350 parts water are added to the above prepared mixture. The pH is kept at 7-8 for 30 minutes, the temperature is then raised to 40° and the mixture is stirred overnight at this temperature and at pH 8. The resulting dyestuff is salted out by adding sodium chloride at 80° filtered and dried in vacuo at an elevated temperature. It corresponds, in free acid form, to the formula

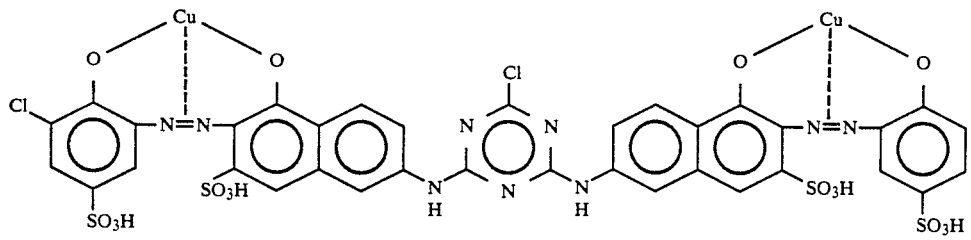

and gives dyeings on cotton of a rubine red shade.

Example 4 (mixed coupling)

4a) 95.6 Parts 2-amino-5-hydroxynaphthalene-7-sulphonic acid are dissolved in 1000 parts water at pH 7.0-7.3 by the addition of 57.2 parts 30% sodium hydroxide solution. This solution which has been adjusted to pH 6.0-6.3 by adding 10% hydrochloric acid shortly before adding, is pumped to a suspension consisting of 36.9 parts cyanuric chloride in 100 parts water and 200 parts ice within 30 minutes without further cooling. After 10 minutes stirring the pH of the mixture is adjusted to 5.5-6.0 by the addition of 20% sodium carbonate solution during 30 minutes. The mixture is heated to 50% and stirring is continued for 75 minutes at this temperature, whilst maintaining the pH at 5.5-6.0 by adding 20% sodium carbonate solution. Finally, 6 parts HYFLO filtering earth are added. The mixture is stirred for 10 minutes and filtered, and the residue is washed with a small amount of water.

4b) To a mixture consisting of 160 parts water, 100 parts ice and 12 parts 30% hydrochloric acid 38.6 parts 2-amino-1-hydroxybenzene-4-sulphonic acid and 45.6 parts 6-chloro-2-amino-1hydroxybenzene-4-sulphonic acid are added with stirring. During 30 minutes diazotization is effected by 102 parts 4N sodium nitrite solution in conventional manner and the resulting mixture is stirred for further 15-20 minutes. During the diazotization, the temperature is held below 10° by the portionwise addition of a total amount of 160 parts ice. The excess nitrous acid is decomposed by adding a small quantity of amidosulphonic acid.

The filtered condensation solution of step 4a) which has been cooled to room temperature is further cooled to 15° by the addition of 200 parts ice. The pH is adjusted to 10.5-11.0 by adding a small amount of 30% sodium hydroxide solution followed by 100 parts 25% ammonium hydroxide solution. To the thus prepared solution the diazo solution of 4b) is pumped within 20-30 minutes. The mixture is stirred for one hour at room temperature. Finally, it is heated to 40° and stirring is continued for further 60 minutes.

A solution of 102 parts copper sulphate pentahydrate in 360 parts water is added dropwise to the obtained dye solution within 30 minutes at pH 9.7. After 5 minutes stirring, the pH is adjusted to 6.5 by slowly adding 23 parts 30% sodium hydroxide solution. When the coppering reaction is finished, the dyestuff is isolated by heating the reaction mixture to 85°-90° and portionwise adding a total amount of ca. 925 parts sodium chloride (25 parts per 100 parts dye solution). The mixture is filtered at 80°. The thus obtained wet presscake is dried in vacuo at 80°-90°.

According to the preparation method as described, a mixture of dyestuffs is obtained consisting of the asymmetric dyestuff A and two symmetric dyestuffs B and C in a ratio A : B : C of approximately 2 : 1 : 1, with A having the formula given for the dyestuff of Example 3. B corresponds to the formula given for the dyestuff of Example 1. C corresponds to the symmetric dyestuff containing 2-amino-1-hydroxybenzene-4-sulphonic acid for each of the diazo components. The obtained dyestuff mixture gives dyeings on cotton of a rubine red shade.

Application Examples

Application Example A 0.5 Parts of the dyes of Examples 1, 2, 3 and 4, respectively, are dissolved in 200 parts water at 60°. 10 Parts cotton fabric, 16 parts Glauber's salt and 4 parts sodium carbonate are subsequently added to the dyebath. The bath is raised to 98° over 45 minutes.

Dyeing is continued for 1 hour at 98°. During dyeing, the water that evaporates is continuously replaced. The dyed fabric is then removed from the liquor, rinsed with cold and hot water, soaped at the boil during 20 minutes in 500 parts water and 0.5 parts sodium alkylsulphonate, rinsed again and dried. A rubine red dyeing (for all dyes employed) is obtained having good light- and wet-fastnesses.

Application Example B 0.5 Parts of the dyes of Examples 1, 2, 3 and 4, respectively, are dissolved in 200 parts demineralized water. 10 Parts cotton cretonne (bleached) are added to the dyebath of 50°-60° and the bath is raised to 98° within 30 minutes. Then 1 part and after 10 minutes further 2 parts calcinated Glauber's salt are added maintaining the temperature at 98° for further 35 minutes. Subsequently, it is cooled to 80° within 15 minutes. During the dyeing procedure, the water that evaporates is replaced with demineralized water of 98°. The dyed fabric is rinsed with running cold water for 5 minutes, centrifugated and dried at 80°. A rubine red dyeing (for all dyes employed) with good light- and wet-fastness properties is obtained.

Application Example C

A cotton fabric dyed with a 1/1 standard depth dyeing of the dyestuffs of Examples 1, 2, 3 and 4, respectively, is padded with an aqueous solution containing 100 g/l of a fixing agent which is a mixture given below, and squeezed out to give a pick-up of about 80%. The fabric is then shock-dried on a tension frame at 175-180° in such a way that the cross-linking time of the dry fabric is 30-45 seconds at this temperature.

The fixing agent is a reaction product (at 70° during 3 hours) of

A) 68.5 parts of a spray-dried solution at pH 7.5 which has been obtained by condensation of 103 parts diethylenetriamine with 84 parts dicyandiamide at 100°(→160° ) and subsequent stepwise neutralisation with 44.6% sulphuric acid with the addition of ice, and (C) 457 parts of a 50% solution of dimethyloldihydroxyethylene urea heated to 70°, to which 23 parts dicyandiamide as stabilizing agent are added. This product may be used as such or together with a catalyst for the cross-linking, e.g. magnesium chloride.

The obtained rubine red cotton dyeing fixed in such a way exhibits excellent wash-fastness, and withstands repeated 60° washes and even a wash at the boil. At the same time a clear improvement of crease resistance is obtained, and the swelling value of the cellulose fibres is reduced.

Application Example D

Instead of the fixing agent used in Application Example C it is also possible to employ the water-soluble precondensate which is obtained by reacting (B) 100 parts of a 50% aqueous solution of the reaction product of epichlorohydrin and dimethylamine with (C) 150 parts of a 50% aqueous solution of dimethyloldihydroxyethylene urea in the presence of (D) 20 parts magnesium chloride hexahydrate at 70° during 30 minutes.

The resulting rubine red cotton dyeing after-treated in such a way shows excellent wash-fastness. At the same time a clear improvement of crease resistance is obtained, and the swelling value of the cellulose fibres is reduced.

Examples 5-50 (Table 1)

According to the method described in Example 1 further dyestuffs may be prepared which may be used according to the inventive application method. These dyes, in the free acid form, correspond to the formula

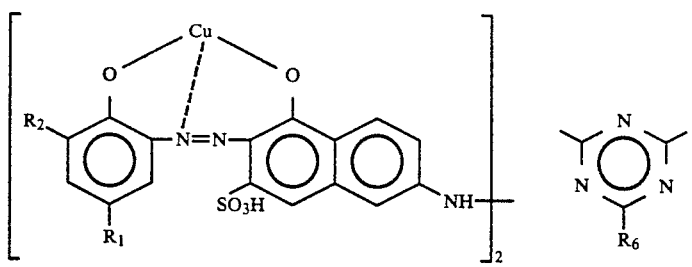

and are listed in the following Table 1. For those dyestuffs containing as $R_6$ a radical other than chlorine, a further condensation step is required to replace the chlorine atom bound to the triazine ring by the corresponding radical $R_6$ other than chlorine. This condensation reaction may be carried out in accordance with known methods before or after the coupling- and/or coppering-reactions.

The dyestuffs of Examples 5–50 dye cotton in a rubine red shade. The dyeings obtained according to Application Example A or B may be after-treated according to the method described in Application Examples C and D yielding dyeings with notably improved wet fastness properties.

TABLE 1

| Ex. No. | $R_1$ | $R_2$ | $R_6$ |
|---|---|---|---|
| 5 | SO₃H | H | Cl |
| 6 | SO₂NH₂ | H | Cl |
| 7 | —SO₂CH₂CH₂OSO₃H | H | Cl |
| 8 | " | H | NH₂ |
| 9 | " | H | —NH—⟨phenyl⟩ |
| 10 | " | H | —NHCH₂CH₂OH |
| 11 | —SO₂CH=CH₂ | H | Cl |
| 12 | " | H | —NH—⟨phenyl-SO₃H⟩ |
| 13 | SO₃H | H | —NH—⟨phenyl⟩—NHCOCH₃ |
| 14 | " | H | —NH—⟨phenyl-SO₃H⟩ |
| 15 | " | Cl | NH₂ |
| 16 | " | Cl | —NHCH₂CH₂CH " |
| 17 | SO₂NH₂ | H | " |
| 18 | SO₃H | Cl | —N(CH₂CH₂OH)₂ |
| 19 | " | Cl | —NH—⟨phenyl-SO₃H⟩ |
| 20 | " | Cl | —NH—⟨phenyl⟩ |
| 21 | Cl | SO₃H | Cl |

TABLE 1-continued

| Ex. No. | $R_1$ | $R_2$ | $R_6$ |
|---|---|---|---|
| 22 | Cl | " | $NH_2$ |
| 23 | Cl | " | $-NHCH_2CH_2OH$ |
| 24 | Cl | " | $-N(CH_2CH_2OH)_2$ |
| 25 | Cl | " | $-NH-\text{C}_6H_4-SO_3H$ |
| 26 | Cl | " | $-NH-\text{C}_6H_5$ |
| 27 | $SO_3H$ | Cl | $-NHC_2H_5$ |
| 28 | " | Cl | $-NH-\text{C}_6H_4-SO_2CH_2CH_2OSO_3H$ |
| 29 | " | Cl | $-NH-\text{C}_6H_4-SO_2CH_2CH_2OSO_3H$ |
| 30 | $CH_3$ | $SO_3H$ | Cl |
| 31 | " | " | $NH_2$ |
| 32 | " | " | $-NH-\text{C}_6H_5$ |
| 33 | H | " | Cl |
| 34 | $SO_3H$ | $-NHCOCH_3$ | Cl |
| 35 | " | " | $NH_2$ |
| 36 | " | " | $-NHCH_2CH_2OH$ |
| 37 | $-NHCOCH_3$ | $SO_3H$ | Cl |
| 38 | " | " | $NH_2$ |
| 39 | " | " | $-NH-\text{C}_6H_5$ |
| 40 | " | " | $-NHCH_2CH_2OH$ |
| 41 | $SO_3H$ | $NO_2$ | Cl |
| 42 | " | " | $-NH-\text{C}_6H_5$ |
| 43 | " | " | $-N(CH_2CH_2OH)_2$ |
| 44 | $NO_2$ | $SO_3H$ | Cl |
| 45 | " | " | $NH_2$ |
| 46 | " | " | $-NH-\text{C}_6H_4-NHCOCH_3$ |

TABLE 1-continued

| Ex. No. | R₁ | R₂ | R₆ |
|---|---|---|---|
| 47 | " | " | —NH—⟨phenyl⟩ |
| 48 | COOH | H | Cl |
| 49 | SO₃H | H | —N(CH₂CH₂OH)₂ |
| 50 | " | H | —N⟨morpholino⟩O |

EXAMPLES 51-83 (Table 2)

Further dyestuffs applicable according to the invention may be prepared in accordance with the method described in Examples 1 to 4. They correspond, in the free acid form, to the formula

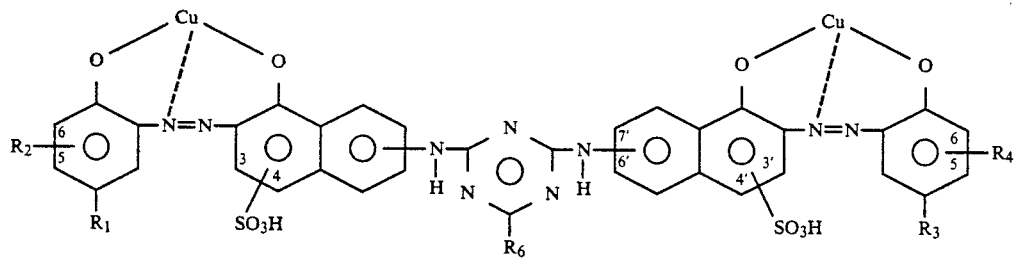

and are listed in the following Table 2. For those dyestuffs containing as $R_6$ a radical other than chlorine an additional condensation step is necessary to replace the chlorine atom by another radical R6. This condensation step is carried out in accordance with known methods. In the case where the dyestuff is prepared according to the method given in Example 1 or 2, the replacement of the chlorine atom may be effected before or after the coupling- and/or coppering-reactions.

According to the preparation method of Example 3, a pure asymmetric dyestuff is obtained. According to the method of Example 4, the corresponding mixture of dyestuffs is obtained. According to the method given in Example 2 depending on the starting materials which are employed, either mainly a pure asymmetric dyestuff or a mixture of dyestuffs corresponding to that of Example 4 is obtained.

The dyestuffs or mixtures of Examples 51-83 dye cotton in a rubine red shade. The dyeings show good light fastness- and wet fastness-properties. Particularly, when after-treated according to the method of Application Examples C and D, the wash fastness properties of the obtained dyeings are improved notably.

TABLE 2

| Ex. No. | R₁ | R₂ (position) | R₆ | R₃ | R₄ (position) | position of SO₃H in the naphthyl radicals | connecting positions of the naphthyl rings |
|---|---|---|---|---|---|---|---|
| 51 | SO₃H | H | Cl | —SO₂—⟨phenyl⟩ | H | 3;3' | 6;6' |
| 52 | SO₂CH₂CH₂OSO₃H | H | Cl | SO₃H | H | " | " |
| 53 | " | H | NH₂ | " | H | " | " |
| 54 | SO₃H | H | Cl | " | H | 4;4' | " |
| 55 | " | Cl(6) | —NHCH₃ | " | H | 3;3' | " |
| 56 | " | " | NH₂ | " | H | " | " |
| 57 | " | " | —NH—⟨phenyl⟩ | " | H | " | " |
| 58 | " | " | Cl | " | H | 4;4' | " |
| 59 | " | —NHCOCH₃(6) | NH₂ | " | H | " | " |
| 60 | " | Cl(6) | Cl | " | Cl(6) | " | " |
| 61 | " | NO₂(6) | Cl | " | " | 3;3' | " |
| 62 | Cl | SO₃H(6) | —NHCH₂CH₂OH | " | H | " | " |
| 63 | Cl | " | " | " | H | 4;4' | " |
| 64 | CH₃ | SO₃H(6) | " | " | H | 3;3' | " |

TABLE 2-continued

| Ex. No. | $R_1$ | $R_2$ (position) | $R_6$ | $R_3$ | $R_4$ (position) | position of $SO_3H$ in the naphthyl radicals | connecting positions of the naphthyl rings |
|---|---|---|---|---|---|---|---|
| 65 | " | " | Cl | " | H | " | " |
| 66 | $SO_3H$ | H | Cl | $SO_3H$ | H | 3;3' | 7;7' |
| 67 | " | Cl(6) | Cl | " | Cl(6) | 4;4' | " |
| 68 | H | $NO_2(5)$ | Cl | " | H | 3;3' | 6;6' |
| 69 | H | " | $NH_2$ | " | $SO_3H(6)$ | 3;3' | " |
| 70 | $SO_3H$ | " | Cl | " | H | " | " |
| 71 | " | " | $NH_2$ | " | H | " | " |
| 72 | Cl | H | Cl | " | H | " | " |
| 73 | H | H | Cl | " | $SO_3H(6)$ | " | " |
| 74 | H | H | $NH_2$ | " | " | " | " |
| 75 | Cl | H | Cl | " | " | " | " |
| 76 | Cl | Cl(6) | Cl | " | " | " | " |
| 77 | $SO_3H$ | COOH(6) | Cl | " | " | " | " |
| 78 | " | H | Cl | $SO_2NHC_2H_4OH$ | H | " | " |
| 79 | " | H | Cl | $SO_2N(C_2H_4OH)_2$ | H | " | " |
| 80 | " | H | Cl | H | COOH(6) | " | " |
| 81 | " | H | Cl | H | H | " | " |
| 82 | " | $SO_3H(6)$ | —NH—⟨phenyl⟩ | H | H | " | " |
| 83 | " | " | Cl | H | $CONH_2(6)$ | " | " |

The dyestuffs or mixtures of Examples 1 to 83 are obtained in the sodium salt form. They may, depending on the reaction/isolation conditions or by further reacting the sodium salts in accordance with known methods, also be obtained in free acid form or in other salt forms, for example those salt forms containing cations as indication in the description hereinbefore. It is also possible to prepare mixed salt forms, i.e. dyestuffs containing different cations.

What we claim is:

1. A complex of the formula

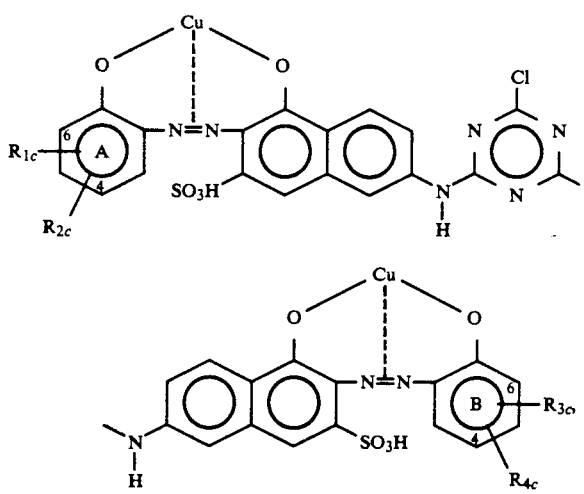

or a salt thereof each cation of which is independently a non-chromophoric cation,
wherein
each of $R_{1c}$ and $R_{3c}$ is independently —$SO_2Zc$, wherein Zc id hydroxy, phenyl or —$NHR_{10c}$,
wherein $R_{10c}$ is hydrogen, methyl, ethyl, cyclohexyl or 2- or 3-hydroxy-($C_{2-3}$alkyl), and
each of $R_{2c}$ and $R_{4c}$ is independently hydrogen, chloro, nitro, methyl, acetamido or —COXc, wherein Xc is hydroxy, —$OR_{9c}$ or amino,
wherein $R_{9c}$ is methyl or ethyl, with the provisos that (1) each of $R_{1c}$–$R_{4c}$ is in the 4- or 6-position of the ring to which it is attached and (2) when one of Rings A and B has an —$SO_2NHR_{10c}$ group in its 4-position, the other of Rings A and B has a sulfo or —$SO_2NHR_{10c}$ group, or a mixture of such complexes, salts or both.

2. A complex according to claim 1, or a salt thereof each cation of which is independently a non-chromophoric cation.

3. A complex according to claim 2, or a salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

4. A complex according to claim 2, or a salt thereof each cation of which is independently a non-chromophoric cation,
wherein each of $R_{2c}$ and $R_{4c}$ is independently hydrogen, chloro or methyl.

5. A complex according to claim 4, or a salt thereof each cation of which is independently a non-chromophoric cation, wherein each of $R_{1c}$ and $R_{3c}$ is independently —$SO_2Zd$,
wherein Zd is hydroxy or amino.

6. A complex according to claim 5, or a salt thereof each cation of which is independently a non-chromophoric cation, wherein each of $R_{1c}$ and $R_{3c}$ is sulfo, and each of $R_{2c}$ and $R_{4c}$ is independently hydrogen or chloro.

7. A complex according to claim 6, or a salt thereof each cation of which is the same non-chromophoric cation.

8. A complex according to claim 7, or a salt thereof each cation of which is lithium, sodium, potassium or ammonium, the cations being the same.

9. A complex according to claim 8, or a sodium salt thereof.

10. The complex according to claim 6 having the formula

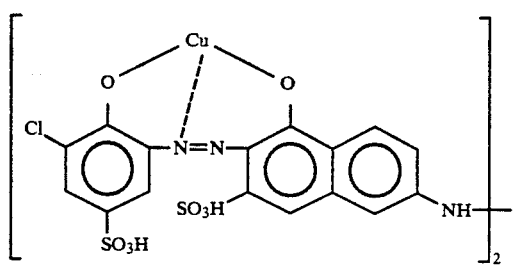

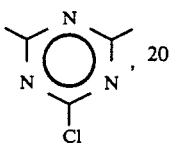

or a salt thereof each cation of which is independently a non-chromophoric cation.

11. The complex according to claim 10 in sodium salt form.

12. The complex according to claim 6 having the formula

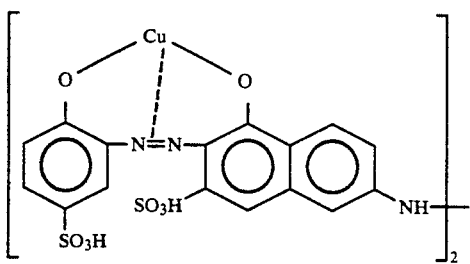

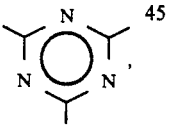

or a salt thereof each cation of which is independently a non-chromophoric cation.

13. The complex according to claim 12 in sodium salt form.

14. The complex according to claim 6 having the formula

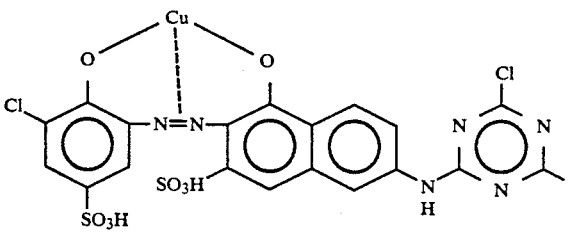

-continued

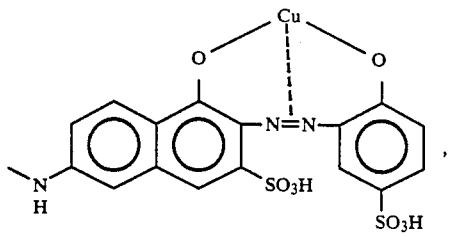

or a salt thereof each cation of which is independently a non-chromophoric cation.

15. The complex according to claim 14 in sodium salt form.

16. The complex according to claim 5 having the formula

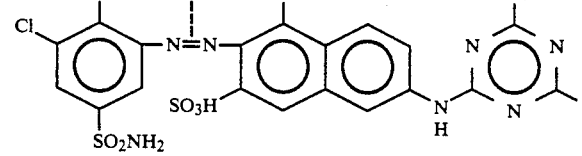

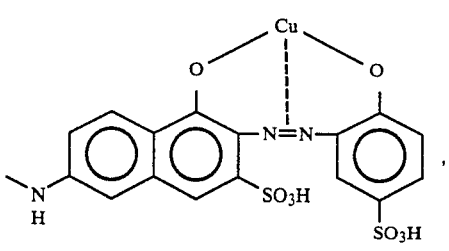

or a salt thereof each cation of which is independently a non-chromophoric cation.

17. A mixture of complexes according to claim 1 consisting of (A) the complex of the formula

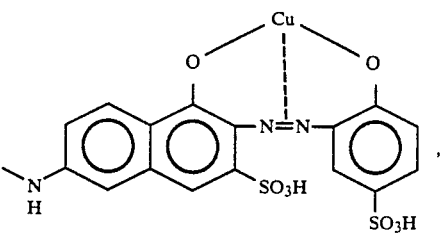

or a salt thereof each cation of which is independently a non-chromophoric cation, (B) the complex of the formula

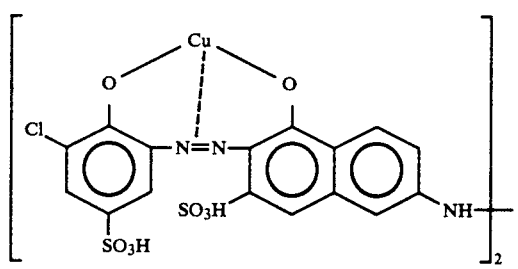
or a salt thereof each cation of which is independently a non-chromophoric cation, and
(C) the complex of the formula
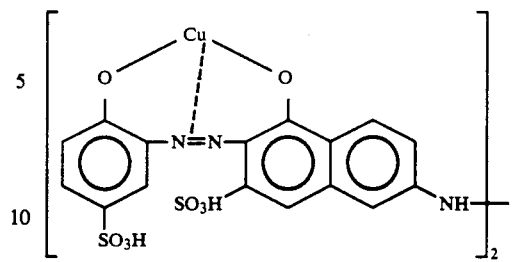
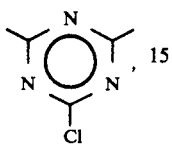
or a salt thereof each cation of which is independently a non-chromophoric cation.
18. A mixture according to claim 17 wherein the ratio of (A) to (B) to (C) is approximately 2 : 1 : 1.
* * * * *